United States Patent
Shida et al.

(10) Patent No.: US 6,670,044 B2
(45) Date of Patent: Dec. 30, 2003

(54) LAMINATE FILM, FIXING FILM AND IMAGE HEATING APPARATUS USING SAME

(75) Inventors: Tomonori Shida, Numazu (JP); Kazuo Kishino, Kawasaki (JP); Masaaki Takahashi, Asaka (JP); Hideyuki Yano, Mishima (JP); Atsuyoshi Abe, Susono (JP); Masahiro Suzuki, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 09/866,586

(22) Filed: May 30, 2001

(65) Prior Publication Data

US 2002/0034621 A1 Mar. 21, 2002

(30) Foreign Application Priority Data

May 31, 2000 (JP) ........................................ 2000-162309

(51) Int. Cl.⁷ ......................... B32B 27/00; B32B 15/08; G03G 15/20
(52) U.S. Cl. ..................... 428/458; 428/411.1; 428/457; 428/473.5; 399/331; 399/33
(58) Field of Search .............................. 428/411.1, 458, 428/473.5, 457; 399/331, 333

(56) References Cited

U.S. PATENT DOCUMENTS

| | | | |
|---|---|---|---|
| 4,705,720 A | * 11/1987 | Kundinger et al. | 428/332 |
| 4,970,219 A | 11/1990 | Effland et al. | 514/339 |
| 5,149,941 A | 9/1992 | Hirabayashi et al. | 219/216 |
| 5,210,579 A | 5/1993 | Setoriyama et al. | 355/285 |
| 5,298,331 A | * 3/1994 | Kanakarajan et al. | 428/458 |
| 5,411,765 A | 5/1995 | Kanakarajan et al. | 427/385.5 |
| 5,525,775 A | 6/1996 | Setoriyama et al. | 219/216 |
| 5,532,056 A | 7/1996 | Satoh et al. | 428/332 |
| 5,568,240 A | 10/1996 | Ohtsuka | 355/285 |
| 5,709,949 A | 1/1998 | Chen et al. | 428/421 |
| 5,863,660 A | 1/1999 | Kumagai et al. | 428/446 |
| 6,007,918 A | 12/1999 | Tan et al. | 428/451 |

FOREIGN PATENT DOCUMENTS

| | | |
|---|---|---|
| EP | 0 659 553 A1 | 6/1995 |
| JP | 63-313182 | 12/1988 |
| JP | 2-157878 | 6/1990 |
| JP | 4-44075 | 2/1992 |
| JP | 4-204980 | 7/1992 |
| JP | 7-114276 | 5/1995 |

* cited by examiner

*Primary Examiner*—P. Hampton-Hightower
(74) *Attorney, Agent, or Firm*—Fitzpatrick, Cella, Harper & Scinto (57) ABSTRACT

A laminate film showing good durability under pressure and heat application, and suitably used as a fixing film for toner image fixation, is provided. Such a laminate film is provided by forming a polyimide resin layer on a metal base layer at a controlled imidation percentage of 70–93%.

14 Claims, 8 Drawing Sheets

LAMINATE FILM, FIXING FILM AND IMAGE HEATING APPARATUS USING SAME

FIELD OF THE INVENTION AND RELATED ART

The present invention relates to a laminate film with excellent durability in use under pressure and heating, and also a fixing film for use in a heating apparatus for heating a material to be heated, or in an image forming apparatus, such as an electrophotographic apparatus or an electrostatic recording apparatus, equipped with such a heating apparatus as an image heating apparatus for heat fixing a yet-unfixed image carried on a recording material. The present invention further relates to such an image heating apparatus.

For convenience of explanation, an image heating apparatus for heat-fixing a toner image onto an image forming apparatus, such as a copying machine or a printer, is described as an example.

Hitherto, a heating roller-type apparatus has been widely used as an image heating apparatus for heat-fixing a yet-unfixed image formed by transfer or directly on a recording material (such as a transfer sheet, an electrofax sheet, an electrostatic recording sheet, an OHP sheet, a printing paper or a format paper) by an appropriate image forming process unit according to an electrophotographic process, an electrostatic recording process.

Such a roller-type heating apparatus basically comprises a fixing roller (heating roller) and a pressure roller constituting a pair of mutually abutting rollers. The rollers are rotated while forming a fixing nip (heating nip) at a mutually abutted portion therebetween, where a recording material carrying a yet-unfixed toner image is introduced and the yet-unfixed toner image is fixed onto the surface of the recording material under the action of heat from the fixing roller and a pressure at the fixing nip. The roller-type heating apparatus is accompanied with a problem that the fixing roller has a large heat capacity, so that a substantial time is required until the roller reaches a prescribed fixing temperature, and in order to acquire a quick start-up performance, the fixing roller has to be kept heated at a certain controlled temperature.

For solving the above problem, a film heating-type fixing apparatus has been proposed, e.g., by Japanese Laid-Open Patent Application (JP-A) 63-313182, JP-A 2-157878, JP-A 4-44075 and JP-A 4-204980.

More specifically, in the film heating-type fixing apparatus, a ceramic heater as a heating member and a pressure roller as a pressing member are caused to nip a heat-resistant film (fixing film) to form a nip (portion), where a recording material carrying a yet-unfixed toner is introduced between the film and the pressure roller and conveyed while being nipped together with the film to transfer the heat from the ceramic heater to the recording material via the film and heat-fix the yet-unfixed toner image onto the recording material surface under a pressure at the nip.

As a characteristic of the film heating-type fixing apparatus, the ceramic heater and the film can be composed of low-heat capacity members to provide an on-demand type device, thus allowing an image forming apparatus wherein the ceramic heater as the heat source is energized to be heated to a prescribed fixing temperature only at the time of image formation, so that the waiting time from the turning-on of the power supply of the image forming apparatus until reaching the image-forming allowable state is short (quick start characteristic) and the power consumption during the stand-by period is remarkably smaller (power economization).

As the film used in the film heating-type apparatus, there has been used a film comprising a heat-resistant resin as represented by polyimide resin excellent in heat-resistance and strength. However, in the case of providing a fixing apparatus adapted to high-speed and high durability use, a resin film alone is insufficient in strength and is therefore desirably backed with a base layer of a metal excellent in strength, such as SUS (stainless steel), nickel, aluminum or copper.

Further, JP-A 7-114276 has proposed a heating apparatus including an electroconductive member constituting a film per se or disposed in proximity with the film, where an eddy current is generated to cause a Joule heat as a source of heating (electromagnetic induction heating system). According to the electromagnetic induction heating system, the heating region can be shifted closer to the material to be heated, so the efficiency of consumed energy can be improved.

The heating apparatus of the electromagnetic induction heating scheme, a cylindrical or endless film as a rotating member is driven in rotation, while being sandwiched under pressure between a film guide and a pressure roller, by following the rotation drive of the pressure roller (i.e., the pressure roller-drive scheme) or driven by itself, while being stretched under tension about a drive roller and a tension roller, so that the pressure roller is driven in rotation by following the drive of the film.

Such a film used in the electromagnetic induction heating generally comprises as a base layer a metal film functioning as an electromagnetic induction heating member and particularly comprising a magnetic material, such as iron, nickel, ferromagnetic SUS (stainless steel) or nickel cobalt alloy.

As a problem in the film heating scheme or the electromagnetic induction heating scheme in the case where the fixing film has a laminate structure including a layer of a metal, such as nickel, the fixing film is liable to show a large frictional resistance with a film guide member at the nip. In a case where a lubricant, such as a heat resistant grease, is placed between the film inner surface and the film guide, a portion of the metal film and the film guide are worn due to continual use and mixed with the grease to deprive the grease of the lubricating effect, thus resulting in an increase in rotation torque.

If a laminate film of a metal layer and a polyimide resin layer is used so as to have the polyimide resin layer surface contacting the film guide, the increase of rotation torque can be prevented, but in this case, the laminate film is caused to have a durability which is lower than that of the uncoated metal layer, by promoting the breakage of the metal layer, so that long-term continuous use under heating and pressure becomes difficult.

SUMMARY OF THE INVENTION

A generic object of the present invention is to provide a laminate film having solved the above-mentioned problem.

Other objects of the present invention are to provide a fixing film showing excellent durability in use under heating and pressure and to provide an image heating apparatus.

According to the present invention, there is provided a laminate film, comprising a metal layer and a polyimide resin layer, wherein the polyimide resin layer has an imidation percentage of 70–93%.

The present invention further provides a fixing film, comprising a metal layer and a polyimide resin layer, wherein the polyimide resin layer has an imidation percentage of 70–93%.

The present invention also provides an image heating apparatus, comprising: a fixing film comprising a metal layer and a polyimide resin layer, and a pair of pressing members pressed against each other via the fixing film, so that the polyimide resin layer of the fixing film is moved in contact with and relative to one of the pressing members and the fixing film supplies, heat to an image on a recording material, wherein the polyimide resin layer of the fixing film has an imidation percentage of 70–93%.

These and other objects, features and advantages of the present invention will become more apparent upon a consideration of the following description of the preferred embodiments of the present invention taken in conjunction with the accompanying drawings.

DETAILED DESCRIPTION OF THE INVENTION

The laminate film and fixing film according to the present invention are both characterized by a polyimide resin layer set to have a lower imidation percentage, thereby showing an improved durability under pressure and heating. More specifically, a polyimide resin is generally used at its imidation percentage of 100%, because an imidation percentage of 100% provides the best mechanical properties. The present invention is however based on a discovery that a polyimide resin layer laminated with a metal layer exhibits an improved durability under pressure and heating when its imidation percentage is 70–93%, particularly 75–93%. This is presumably because a suppressed imidation percentage provides an increased flexibility of the polyimide resin layer, thus alleviating a mechanical stress acting on the metal layer to improve the durability of the laminate film as a whole.

If the imidation percentage is below 70%, the polyimide resin layer becomes excessively flexible, thus having a lower wear resistance and resulting in an increase of rotation torque due to the worn powder at the nip. If the imidation percentage is above 93%, the effect of the present invention accompanying a lower imidation percentage becomes minimal.

The polyimide resin used in the present invention may generally be formed by a dehydration-ring closure reaction between an aromatic carboxylic dianhydride and an aromatic diamine. The imidation percentage is defined as a percentage ratio between the amount of imide rings in a sample polyimide and the amount of imide rings of the polyimide after complete imidation. The imidation percentage referred to herein is based on FTIR/ATR (Fourier-Transform Infrared Spectroscopy/Attenuated Total Reflection) measurement of a surface of a sample polyimide resin layer to obtain a ratio (a/b) between an absorbance (a) of a peak at about 1773 cm$^{-1}$ attributable to C=O vibration of an imide ring and an absorbance (b) of a peak at about 1514 cm$^{-1}$ attributable to skeleton vibration of a benzene ring. An absorbance ratio (A/B) is determined in the same manner for the same polyimide baked at 400° C. and is assumed to represent an imidation percentage of 100%. Based on the two ratios (a/b) and (A/B), an imidation percentage of the sample is given by the following equation:

Imidation percentage (%)=[(a/b)/(A/B)]×100, wherein a: absorbance of a peak near 1773 cm$^{-1}$ and b: absorbance of a peak near 1514 cm$^{-1}$, respectively, of a sample polyimide resin layer, and A: absorbance of a peak near 1773 cm$^{-1}$, and a: absorbance of a peak near 1514 cm$^{-1}$, respectively, of a sample of the same polyimide baked at 400° C.

As is understood from the explanation, the polyimide resin layer of the laminate film of the present invention having a controlled imidation percentage or 70–93% can be obtained through a controlled imidation of a polyimide precursor layer formed on the metal layer.

The above-discussed effect attributable to a lower imidation percentage of the polyimide resin layer in the laminate film of the present invention can be basically obtained for any aromatic polyimide formed by a dehydration-ring closure reaction between an aromatic carboxylic dianhydride and an aromatic diamine as mentioned above, but it is particularly preferred to use a polyimide resin having a recurring unit of formula (1) below:

(1)

wherein a lowering in imidation percentage is not reflected. The polyimide resin may be referred to as a polycondensation product between biphenyl-3,3'-4,4'-tetracarboxylic dianhydride and para-diaminobenzene.

The laminate film according to the present invention basically includes a metal layer in lamination with the polyimide resin layer. The metal layer may preferably be a nickel layer.

It is suitable that the metal layer has a thickness of 1–100 μm, and the polyimide resin layer has a thickness of 5–100 μm.

The laminate film may preferably include an elastic layer of, e.g., 10–500 μm in thickness on the metal layer, and a release layer of, e.g., 1–100 μm in thickness further thereon.

The release layer may suitably comprise a material selected from the group consisting of fluorine-containing resin, silicone resin, fluorosilicone rubber, fluorine-containing rubber and silicone rubber.

Hereinbelow, some embodiments of the image heating apparatus according to the present invention incorporated in an electrophotographic image forming apparatus will be described.

(First Embodiment)

(1) Image-forming Apparatus

Figure 2:
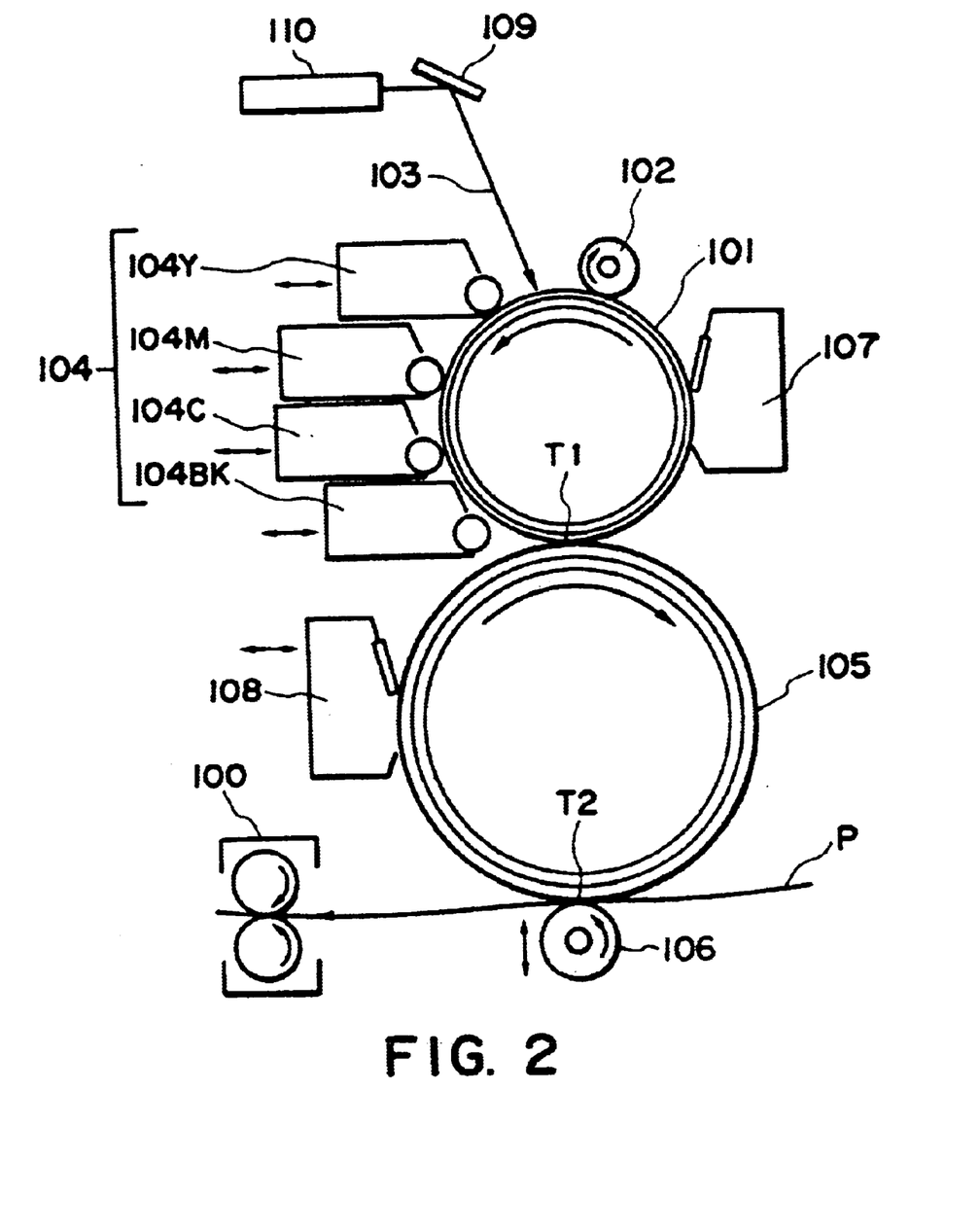
FIG. 2 illustrates an organization of a full-color image forming apparatus according to a first embodiment of the invention.

FIG. 2 is a schematic illustration of an electrophotographic color printer as an example of an image forming apparatus.

Referring to FIG. 2, the image forming apparatus includes a photosensitive drum (image bearing member) 101 comprising organic photosensitive material, or amorphous silicon, and rotatively driven in an indicated arrow direction at a predetermined process speed (peripheral velocity).

The photosensitive drum 101 is uniformly charged to a predetermined polarity and potential by a charging apparatus 102 such as a charging roller.

The uniformly charged surface of the photosensitive drum 101 is exposed to a scanning laser beam 103 which carries the image data of an objective image, and is projected from a laser optical box (laser scanner) 110; the laser optical box 110 projects the laser beam 103 while modulating it (on/off) in accordance with sequential electrical digital signals which reflect the image data of the objective image. As a result, an electrostatic latent image correspondent to the image data of the objective image is formed on the peripheral surface of the rotatory photosensitive drum 101. The sequential electrical digital signals are supplied from an image signal generation apparatus such as an image reading apparatus, which is not illustrated in the drawing. A mirror 109 deflects the laser beam projected from the laser optical box 110, onto a point to be exposed on the photosensitive drum 101.

In full-color image formation, an objective image is subjected to a color separation process in which the color of the objective image is separated into, for example, four primary color components. Then, the above described scanning exposure and image formation processes are carried out for each of the primary color components, starting from, for example, yellow component. The latent image correspondent to the yellow color component is developed into a yellow toner image by the function of a yellow color component developing device 104Y of a color developing device 104. Then, the yellow toner image is transferred onto the peripheral surface of an intermediary transfer drum 105, at a primary transfer point $T_1$, which is the contact point of the photosensitive drum 101 and the intermediary transfer drum 105 (or the point at which the distance between the photosensitive drum 101 and the intermediary transfer drum 105 becomes smallest). After the toner image is transferred onto the surface of the intermediary transfer drum 105, the peripheral surface of the photosensitive drum 101 is cleaned by a cleaner 107; foreign matters such as the residual toner particles from the transfer section are removed from the peripheral surface of the photosensitive drum 101 by the cleaner 107.

Next, a process cycle comprising the above described charging process, scanning/exposing process, developing process, primary transfer process, and cleaning process is also carried out for the rest (second, third, and fourth) of the primary color components of the target image. More specifically, for the latent image correspondent to the second primary color component, that is, magenta color component, a magenta color component developing device 104M is activated; for the latent image correspondent to the third primary color components, a cyan color component developing device 104C; and for the latent image for the fourth color component, a black color component developing device 104BK is activated. As a result, a yellow toner image, a magenta toner image, a cyan toner image, and a black toner image are superposed in the aforementioned order on the peripheral surface of the intermediary transfer drum 105, effecting a compound full-color toner image of the target image.

The intermediary transfer drum 105 comprises a metallic drum, an elastic middle layer with medium resistance, and a surface layer with high resistance. It is disposed so that its peripheral surface is placed in contact with, or extremely close to, the peripheral surface of the photosensitive drum 101. It is rotatively driven in the indicated arrow direction at substantially the same peripheral velocity as that of the photosensitive drum 101. The toner image an the photosensitive drum 101 is transferred onto the peripheral surface of the intermediary transfer drum 105 using the potential difference created by applying a bias voltage to the metallic drum of the intermediary transfer drum 105.

The compound full-color toner image formed on the peripheral surface of the intermediary transfer drum 105 is transferred onto the surface of a recording medium P, at a secondary transfer point $T_2$, that is, a contact nip between the intermediary transfer drum 105 and a transfer roller 106. The recording medium P is delivered to the secondary transfer point $T_2$ from an unillustrated sheet feeding portion with a predetermined timing. The transfer roller 106 transfers all at once the compound color toner image from the peripheral surface of the intermediary transfer drum 105 onto the recording medium P by supplying the recording medium P with charge having such polarity that is opposite to the polarity of the toner, from the back side of the recording medium P.

After passing through the secondary transfer point $T_2$, the recording medium P is separated from the peripheral surface of the intermediary transfer drum 105, and then is introduced into an image heating apparatus (fixing apparatus) 100, in which the compound full-color toner image composed of layers of toner particles of different colors is thermally fixed to the recording medium P. Thereafter, the recording medium P is discharged from the image forming apparatus into an unillustrated delivery tray. The fixing apparatus 100 will be described in detail in a subsequent section (2).

After the compound full-color toner image has been transferred onto the recording medium P, the intermediary transfer drum 105 is cleaned by a cleaner 108; the residue, such as the residual toner from the secondary transfer or paper dust, on the intermediary transfer drum 105 is removed by the cleaner 108. Normally, the cleaner 108 is kept away from the intermediary transfer drum 105, and when the full-color toner image is transferred from the intermediary transfer drum 105 onto the recording medium P (secondary transfer), the cleaner 108 is placed in contact with the intermediary transfer drum 105.

Also, the transfer roller 106 is normally kept away from the intermediary transfer drum 105, and when the full-color toner image is transferred from the intermediary transfer drum 105 onto the recording medium P (secondary transfer), the transfer roller 106 is pressed on the intermediary transfer drum 105, with the interposition of the recording medium P.

The image forming apparatus illustrated in FIG. 2 can be operated in a monochromatic mode, for example, a blackand-white mode. It also can be operated in a double-sided mode, as well as a multi-layer printing mode.

In a double-sided mode, after an image is fixed to one (first) of the surfaces of the recording medium P, the recording medium P is delivered to an unillustrated recirculating mechanism, in which the recording medium P is turned over, and then, is fed into the secondary transfer point $T_2$ for the second time so that another toner image is transferred onto the other (second) surface. Then, the recording medium P is sent into the image heating apparatus for the second time, in which the second toner image is fixed. Therefore, the recording medium P is discharged as a double-side print from the main assembly of the image forming apparatus.

In a multi-layer made, after coming out of the image heating apparatus 100, with the first image on the first surface, the recording medium P is sent into the secondary transfer point $T_2$ for the second time, without being turned over through the recirculating mechanism. Then, the second image is transferred onto the first surface, to which the first image has been fixed. Then, the recording medium P is introduced into the image heating apparatus 100 for the second time, in which the second toner image is fixed. Thereafter, the recording medium P is discharged as a multi-layer image print from the main assembly of the image forming apparatus.

(2) Fixing Apparatus (Heating Apparatus) 100

An embodiment of a fixing apparatus will now be described more specifically.

Figure 3:
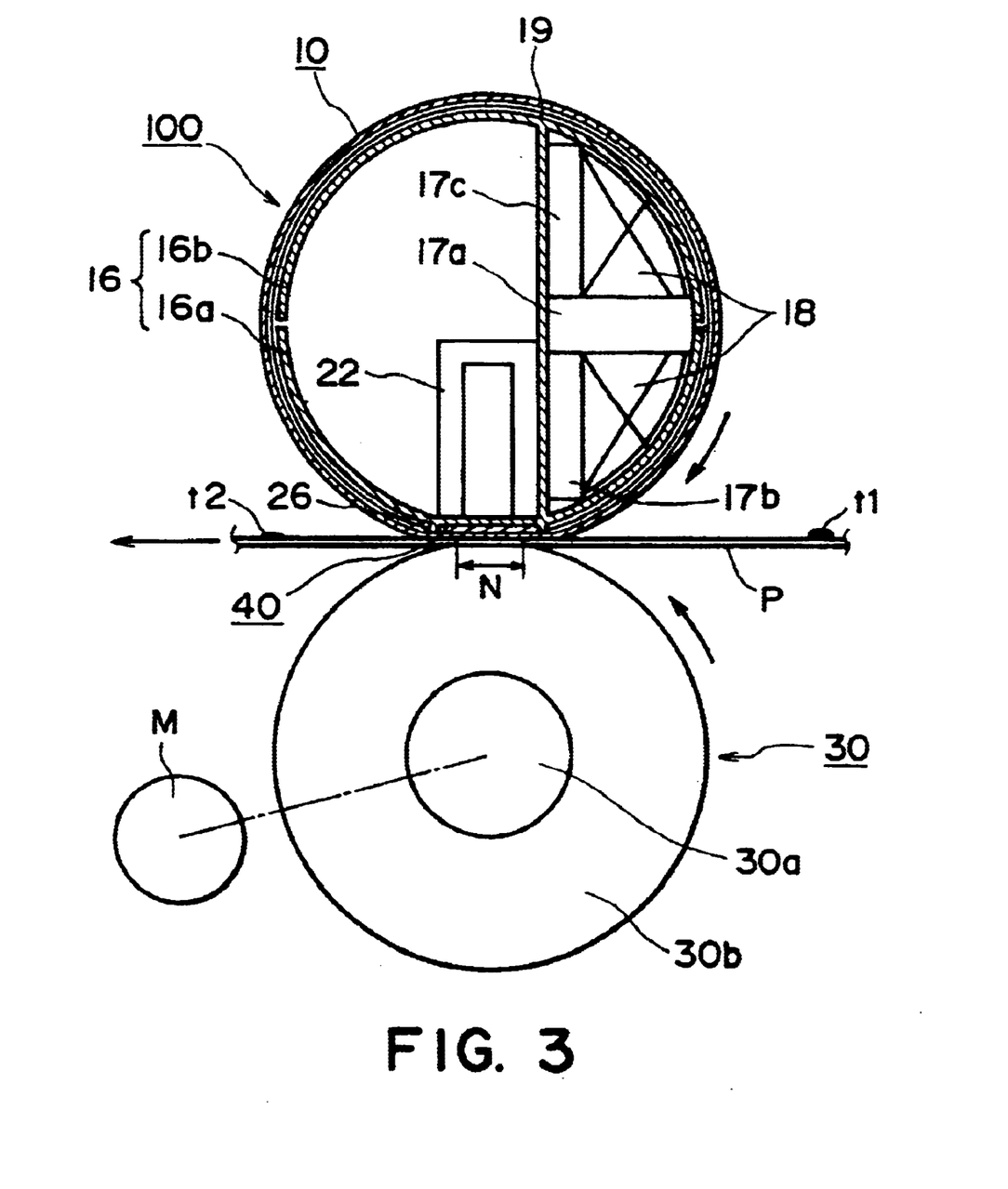
FIG. 3 is a schematic transverse section of a heating apparatus (fixing apparatus) used in the first embodiment.
Figure 4:
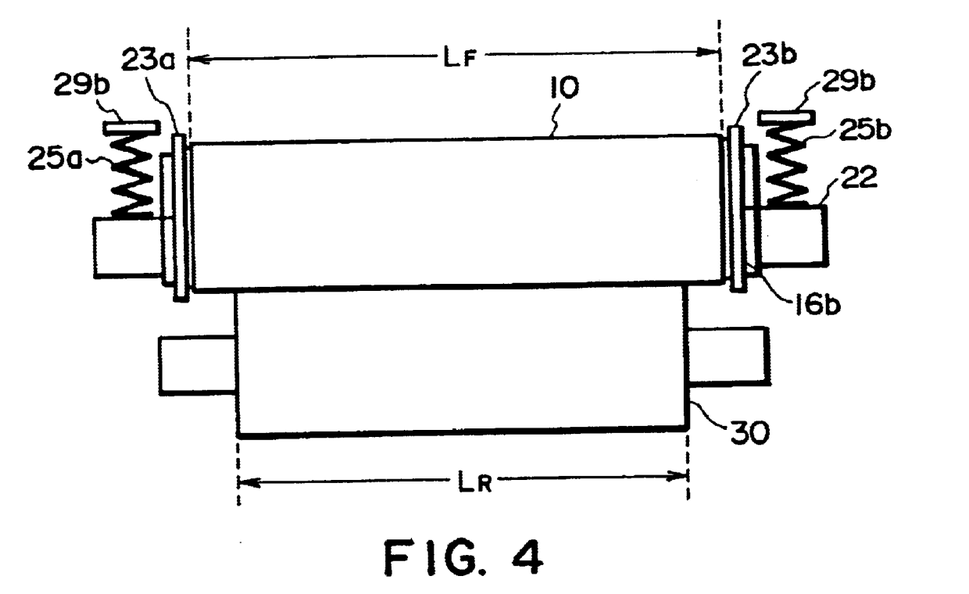
FIG. 4 is a schematic front view of an essential portion of the heating apparatus of FIG. 3.
Figure 5:
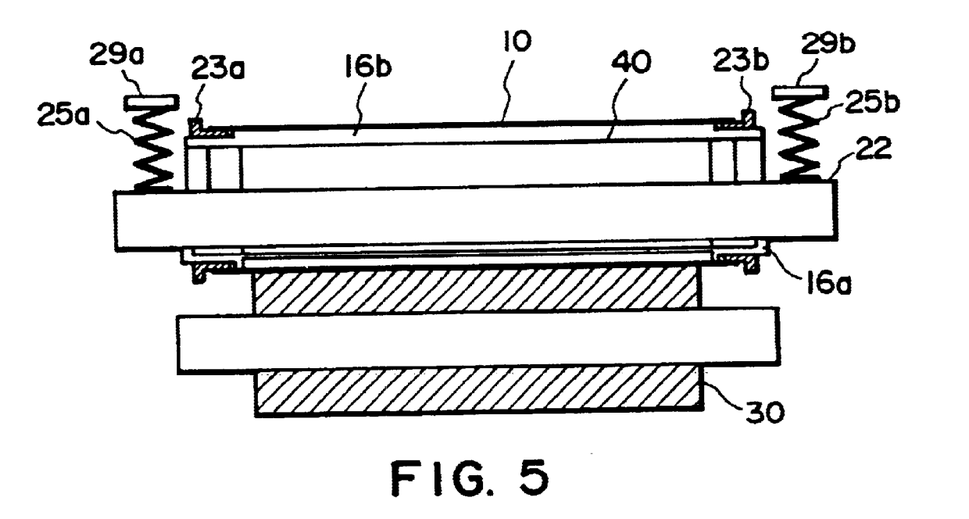
FIG. 5 is a schematic longitudinal section of an essential portion of the heating apparatus of FIG. 3.

FIG. 3 is a schematic cross section of an essential portion of the fixing apparatus 100 in this embodiment which is an electromagnetic induction heating-type apparatus, and FIG. 4 is a schematic front view of the portion illustrated in FIG. 3. FIG. 5 is a longitudinal, vertical section of the portion illustrated in FIG. 13.

The magnetic field generating means comprises magnetic cores 17a, 17b and 17c and an excitation coil 18.

The magnetic cores 17a, 17b and 17c are members with high magnetic permeability. As for the material for these cores, material such as ferrite or permalloy which is used as the material for a transformer core is desirable; preferably, ferrite in which loss is small even when operational frequency is above 100 kHz.

As for the excitation coil 18, a plurality of fine copper wires, each of which is individually coated with electrically insulative material, are bundled, and this bundle of insulator-coated fine wires is wound a given number of turns to form the excitation coil 18. In this embodiment, the bundle of wires is wound 11 turns.

As for the insulator for coating the copper wires, heat resistant insulator may preferably be used in consideration of the conduction of the heat generated in the fixing film 10, e.g., polyimide having a heat-resistant temperature of 220° C. in this embodiment. The density of the coil wires may be increased by applying external pressure to the excitation coil 18.

Between the magnetic field generation means and the fixing film 10, an insulating member 19 is disposed, preferably comprising an electrically insulative and heat resistant material. For example, phenolic resin, fluorinated resin, polyimide resin, polyamide resin, polyamide-imide resin, polyether ether ketone (PEEK) resin, polyether sulfone (PES) resin, polyphenylene sulfide (PPS) resin, perfluoroalkyl ether (PFA) resin, polytetrafluoroethylene (FTFE) resin, tetrafluoroethylene-hexafluoropropylene copolymer (FEP) resin, liquid crystal polymer (LCP) resin, and the like, are desirable candidates for the selection.

Figure 7:
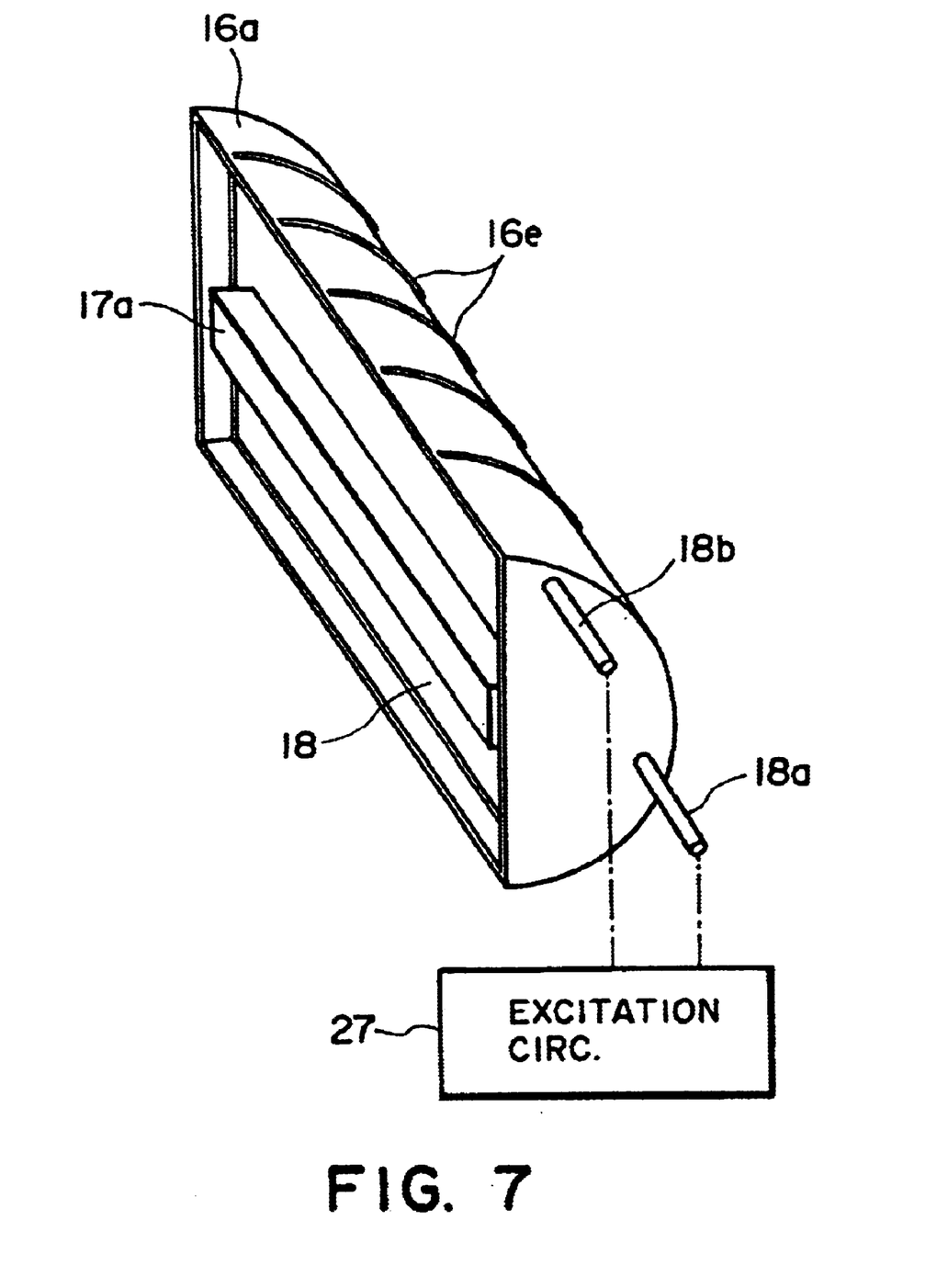
FIG. 7 is a schematic illustration of a magnetic field generating means.

As shown in FIG. 7, the excitation coil 18 is connected to an excitation circuit 27 via power supply lead wires 18a and 18b. The excitation circuit 27 can generate high frequency waves of 20 kHz to 500 kHz by using a switching power source. The excitation coil 18 generates alternating magnetic flux based on an alternating high-frequency current supplied from the excitation circuit.

Figure 6:
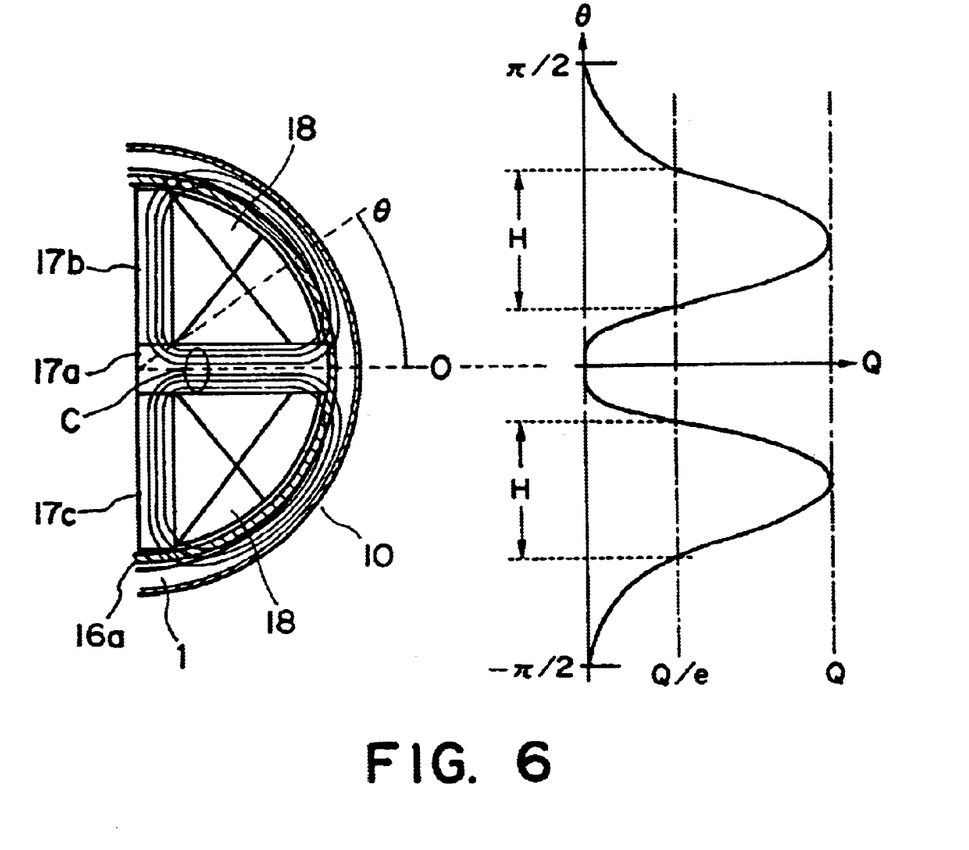
FIG. 6 illustrates a relationship between a magnetic flux and a generated heat quantity.

FIG. 6 schematically depicts the direction and distribution of the alternating magnetic flux adjacent to the fixing nip N.

An alternating magnetic flux (C) is guided by the magnetic cores 17a, 17b, and 17c to be concentrated between the magnetic cores 17a and 17b, and between the magnetic cores 17a and 17c, generating eddy current in the electromagnetic induction based heat generating layer 1 of the fixing film 10. This eddy current generates Joule heat (eddy current loss) in the electromagnetic induction based heat generating layer 1, in accordance with the specific resistance of the heat generating layer 1. The amount of the heat generated by the electromagnetic induction based heat generating layer 1 is determined by the density of the magnetic flux which permeates through the electromagnetic induction based heat generating layer 1, and is distributed as shown by the graph in FIG. 6. In FIG. 6 which is a graph, the locational points on the fixing film 10 are plotted on the ordinate, being expressed by the angle θ from the center (0°) of the fixing nip, and the amount of the heat generated in the electromagnetic induction based heat generating layer 1 of the fixing film 10 is plotted on the abscissa. A heat-generating or exothermic region is defined as a region generating a heat quantity of Q/e (wherein Q represents a locally maximum generated heat, and e represents a base of natural logarithm) as shown in FIG. 6. This is a region providing a heat quantity necessary for fixation.

The temperature of the fixing nip N is maintained at a predetermined level by controlling the electric current supplied to the excitation coil 18 through the excitation circuit, by means or a temperature control system (not shown) operated based on the temperature data obtained through a temperature detecting element 26. The temperature detecting element 26, which detects the temperature of the fixing film 10, is a temperature sensor such as a thermistor.

The pressure roller 30 as a pressing or backup member comprises a metallic core 30a and an elastic layer 30b. The elastic layer 30b is concentrically formed around the metallic core 30a, covering the peripheral surface of the core 30a, and is composed of heat resistant material such as silicone rubber, fluorinated rubber, fluorinated resin, or the like. The pressure roller 30 is fitted between unillustrated side plates of the main assembly of the image forming apparatus, being rotatively supported by bearings, at the respective longitudinal ends of the metallic core 30a.

Between the longitudinal ends of the rigid pressing stay 22, and the spring seats 29a and 29b, springs 25a and 25b are fitted, respectively, in a state of compression, to press the rigid pressing stay 22 downward. With this arrangement, a fixing nip N with a predetermined width is formed, in which the fixing film 10 is sandwiched between the bottom surface of the film guide 16a and the upward facing peripheral surface of the pressure roller 30. The bottom surface of the magnetic core 17a is squarely aligned with the fixing nip N, sandwiching the bottom portion of the belt guide 16a. The film guide member 16 (16a, 16b) may preferably comprise a heat-resistant resin, such as heat-resistant phenolic resin, LCP resin, PPS resin or PEEK resin.

The pressure roller 30 is rotatively driven by a driving means M in the indicated arrow direction. As the pressure roller 30 is rotationally driven, rotational force is applied to the fixing film 10 by the friction between the pressure roller 30 and the outward surface of the fixing film 10, whereby the fixing film 10 is rotated along the peripheral surfaces of the belt guides 16a and 16b in the indicated arrow direction at a peripheral velocity substantially equal to the peripheral velocity of the pressure roller 30. In the fixing nip N, the inward surface of the fixing film 10 slides on the bottom surface of the film guide 16a, flat and in contact with the surface.

With the above setup, following the rotation of the pressure roller 30, the cylindrical fixing film 10 is rotated along the outward surfaces of the guides 16a and 16b, and electrical current is supplied to the excitation coil 18 within the guide from the excitation circuit to generate heat in the fixing film 10 through electromagnetic induction. As a result, the temperature of the fixing nip N is increased. As the temperature of the fixing nip N reaches the predetermined level, it is maintained at this level. With the heating apparatus in this state, a recording medium P, on which a toner image t1 has been deposited without being fixed thereto, is introduced into the fixing nip N, between the fixing film 10 and the pressure roller 30, with the image bearing surface of the recording medium P facing upward so that it will come in contact with the outward surface of the film 10. Then, the recording medium P is passed through the fixing nip N, along with the fixing film 10, while being compressed by the pressure roller 30 and the belt guide 16, with the image bearing surface being flat and in contact with the outward surface of the fixing film 10. While the recording medium P, bearing the yet-to-be-fixed toner image t1, is passed through the fixing nip N as described above, this toner image borne on the recording medium P is heated by the heat electromagnetically induced in the fixing film 10, being thereby fixed to the recording medium P. After passing through the fixing nip N, the recording medium P separates from the outward surface of the rotating fixing film 10, and is conveyed further to be discharged from the image forming apparatus. After passing through the fixing nip N while being thermally fixed to the recording medium P, the toner image t2 cools down and becomes a permanently fixed image.

Flange members 23a and 23b are fitted around the longitudinal ends of the film guides 16a and 16b so as to regulate the movement of the fixing film 10 in the longitudinal direction of the film guides 16a and 16b. It is possible that the flange members 23a and 23b are arranged to be rotated following the rotation of the fixing film 10.

In a case where a toner containing a low softening point substance is used, an oil application mechanism for offset prevention can be omitted from the fixing apparatus, but such oil application or cooling separation for offset prevention can be adopted as desired even in the case of using a toner containing such a low-softening point substance and especially when using a toner not containing such a low-softening point substance.

(3) Fixing Film 10

Figure 1:
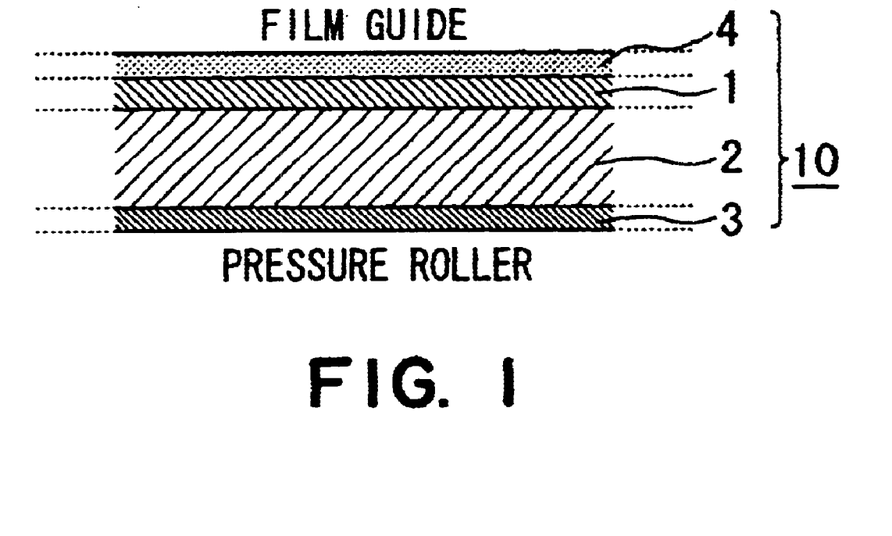
FIG. 1 is a sectional view showing a laminar structure of a fixing film of the electromagnetic induction heat-generation type.

FIG. 1 is a schematic vertical section of the fixing film 10 in this embodiment. This fixing film 10 has a laminate structure, including an electrically conductive layer, forming the heat generating layer 1, which is formed of metallic film or the like, and constitutes the base layer of the fixing film 10; an elastic layer 2 laid on the outward surface of the heat generating layer 1; a release layer 3 laid on the outward surface of the elastic layer 2; and a rubbing layer 4 laid on an inward surface of the heat generating layer 1. In order to assure the adhesion between the heat generating layer 1 and the elastic layer 2, and the adhesion between the elastic layer 2 and the release layer 3, primer layers (unillustrated) may be placed between the respective layers. The rubbing layer 4 is on the inward side of the cylindrical fixing film 10, and the release layer 3 is on the outward side. As described above, as alternating magnetic flux acts on the heat generating layer 1, eddy current is generated in the heat generating layer 1, and this eddy current generates heat in the heat generating layer 1. The thus generated heat heats the fixing film 10 through the elastic layer 2 and the release layer 3, and in turn, the fixing film 10 heats the recording medium, that is, an object to be heated, which is being passed through the fixing nip N, to thermally fix the toner image.

a. Heat Generating Layer 1

The heat generating layer 1 can be composed of nonmagnetic metal, but usage of ferromagnetic material or alloy thereof such as nickel, iron, magnetic SUS, nickel-cobalt alloy, or the like is preferable.

As for the thickness of the heat generating layer 1, it is desired to be no less than the skin depth σ (m) expressed by the formula given below, and no more than 200 $\mu$m:

$$\sigma = 503 \times (\rho/f\mu)^{1/2}$$

wherein f stands for the frequency (Hz) of the excitation circuit; $\mu$, the magnetic permeability; and $\rho$ stands for specific resistance (Ωm).

Figure 8:
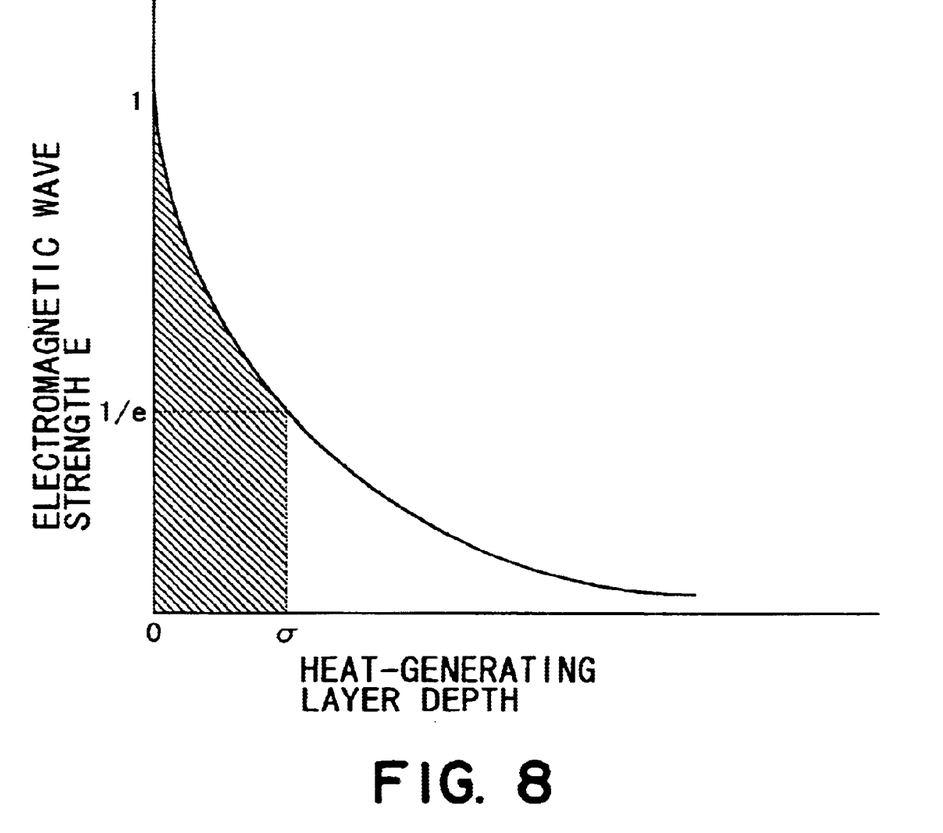
FIG. 8 is a graph showing a relationship between a heat-generating layer depth and an electromagnetic wavelength.
Figure 9:
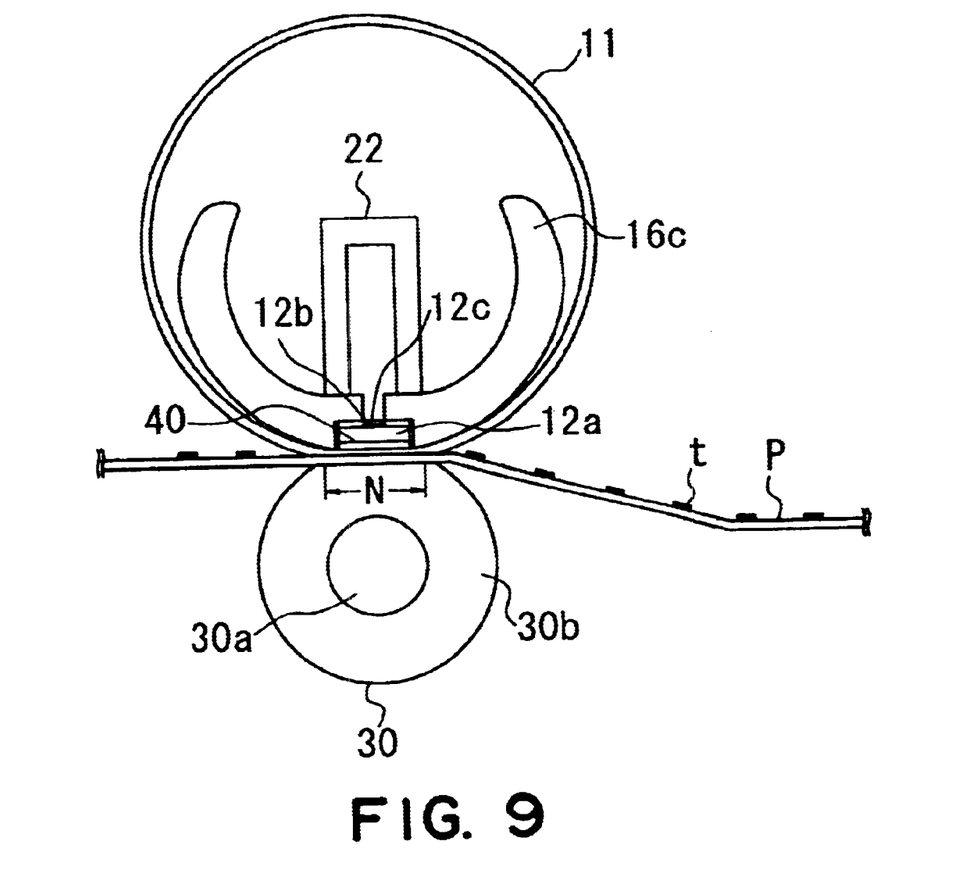
FIG. 9 is a schematic transverse section of a heating apparatus (fixing apparatus) according to a second embodiment of the invention.
Figure 10:
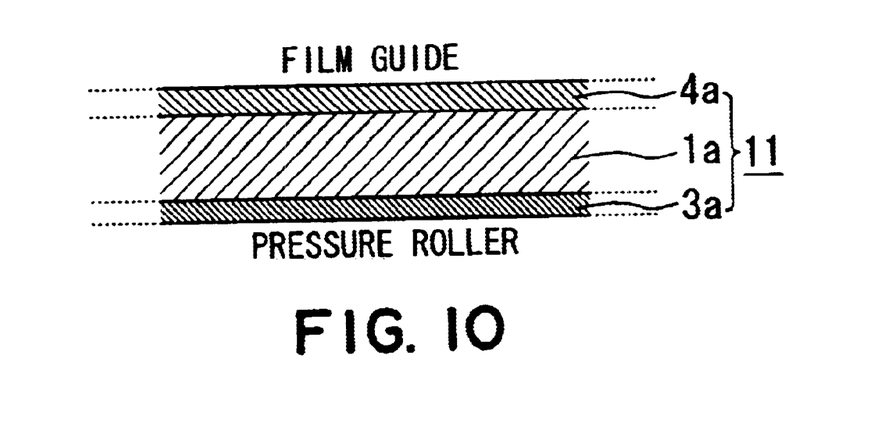
FIG. 10 is a sectional view showing a laminar structure of a fixing film used in the second embodiment.

The skin depth σ represents a depth of absorption of electromagnetic wave used for electromagnetic induction. At a larger depth, the electromagnetic wave intensity becomes lower than 1/e. In other words, most energy is absorbed in a depth up to the skin depth σ (FIG. 8). More specifically, the thickness of the heat generating layer 1 is desirably in a range of 1–100 $\mu$m. If the thickness of the heat generating layer 1 is below 1 $\mu$m, all the electromagnetic energy cannot be absorbed; heat generating efficiency deteriorates. If the thickness of the heat generating layer 1 exceeds 100 $\mu$m, the heat generating layer 1 becomes too rigid; in other words, too much of its flexibility is lost for it to be practically used as a rotatory member.

b. Elastic Layer 2

The elastic layer 2 is composed of such material that is good in heat resistance and thermal conductivity; for example, silicone rubber, fluorinated rubber, fluoro-silicone rubber, and the like.

The thickness of the elastic layer 2 is desirably in a range of 10–500 $\mu$m, so as to ensure the fixed image quality.

In the case of printing a color image, particularly a photographic image, a solid image is formed over a large area on a recording material. In this case, if the heating surface (release layer 3) of the fixing film fails to follow the unevennesses of the recording material or a toner layer formed thereon, the toner layer is unevenly heated to result in images with gloss irregularities between a region of larger heat conduction and a region of smaller heat conduction. If the thickness of the elastic layer 2 is below 10 $\mu$m, the fixing film 10 fails to function as an elastic member, thus applying a non-uniform pressure distribution at the time of fixation. As a result, particularly at the time of full-color image fixation, it becomes difficult to sufficiently heat-fix a yet-unfixed toner of a secondary color, thus resulting in gloss irregularity in the fixed image due to insufficient fusion and failure in obtaining highly defined full-color images. On the other hand, if the elastic layer 2 has a thickness exceeding 500 $\mu$m, the heat conduction at the time of fixation can be obstructed to result in an inferior thermal flowability of the fixing surface, so that the quick-start performance can be impaired and fixing irregularity is liable to occur.

As for the hardness of the elastic layer 2, the excessive hardness of the elastic layer 2 does not allow the elastic layer 2 to conform to the irregularities of the recording medium surface or the toner layer, causing glossiness to be uneven across an image. Hence, it is desirable that the hardness of the elastic layer 2 is at most 60° (JIS-A), preferably at most 45° (JIS-A).

The thermal conductivity λ of the elastic layer 2 is desirably in the range of $2.5 \times 10^{-3}$–$8.4 \times 10^{-3}$ (W/cm.° C.). When the thermal conductivity λ is lower than $2.5 \times 10^{-3}$ (W/cm.° C.), the thermal resistance becomes large, which slows down the speed at which the temperature of the surface layer (release layer 3) of the fixing film 10 rises. When the thermal conductivity λ exceeds $8.4 \times 10^{-3}$ (W/cm.° C.), the hardness of the elastic layer 2 increases too much, and also the permanent deformation of the elastic layer 2 caused by compression worsens. Therefore, it is desirable that the heat conductivity λ is in the range of $2.5 \times 10^{-3}$–$8.4 \times 10^{-3}$ (W/cm.° C.), preferably in a range of $3.3 \times 10^{-3}$–$6.3 \times 10^{-3}$ (W/cm.° C.).

c. Release Layer 3

As for the material for the release layer 3, it can be selected from among such materials as fluorinated resin, silicone resin, fluoro-silicone rubber, fluorinated rubber, silicone rubber, PFA, PTFE, PEP, or the like, in view of releasability and heat resistance.

The thickness of the release layer 3 is desirably in a range of 1–100 μm. If the thickness of the release layer 3 is below 1 μm, the unevenness of the release layer 3 manifests as lubricous unevenness, creating spots inferior in lubricity or durability. On the other hand, if the thickness of the release layer 3 exceeds 100 μm, thermal conductivity deteriorates; in particular, if the release layer 3 is composed of resin, the hardness of the release layer 3 becomes too high to remove the effect of the elastic layer 2.

d. Rubbing Layer 4

In the present invention, the rubbing layer 4 is formed as a layer of a polyimide resin which is highly heat-resistant, exhibits a high strength and provides a smooth surface.

Now, a method of forming a polyimide resin layer (rubbing layer) 4 on an inward surface of the heat-generating layer (metal layer) 1 as a base layer of the fixing film will now be described.

As mentioned above, the polyimide resin layer 4 may be formed of an aromatic polyimide resin, and a preferred example thereof is one represented by a recurring unit of the above-mentioned formula (1). More specifically, for the formation of a layer 4 of the polyimide resin on the metal layer 1, a solution (e.g., in NMP (N-methylpyrrolidone)) of a polyamic acid as the precursor of the aromatic polyimide is applied. The polyamic acid may be formed by polymerization between biphenyltetracarboxylic dianhydride (BPDA) and paraphenylene diamine (PPD). A commercially available example of such a polyamic acid solution is available under a trade name of "U-Varnish S" (available from Ube Kosan K.K.) which is a ca. 20%-solution in NMP of the polyamic acid.

For the formation of an ordinary polyimide resin layer, the polyamic acid solution may be applied on the metal film and heated for removal of the solvent and baking to cause imidation, e.g., by gradual and stepwise heating from 120° C. up to 450° C. as recommended by the supplier of the polyamic acid solution. In the present invention, however, the heating temperature should preferably be suppressed to at most 280° C., more preferably at most 250° C., so as to form a polyimide resin layer having a controlled imidation percentage.

As a first method for application of the polyamic acid solution of on a cylindrical metal film, an outer surface of the film may be covered with a cap, and the level of the polyamic acid solution bath is gradually raised relative to the film (dipping). Before the dipping, the inner surface of metal film formed by electroforming or rolling may be treated with abrasive particles and/or an organic solvent for removal of dust and oil attached thereto during the formation. The applied layer of the varnish (polyamic acid solution) is then subjected to drying for removal of the solvent and baking to form a polyimide resin layer.

Instead of the dipping, it is also possible to vertically hold the cylindrical metal film and close the bottom of the cylindrical metal film with a cap equipped with a stopped withdrawal port. Then, the cylindrical film is filled up to the upper edge thereof with the polyamic acid solution, which is then gradually withdrawn through the withdrawal port to selectively coat the inner surface of the cylindrical metal film. Alternatively, it is also possible to supply the polyamic acid solution onto the inner surface of a cylindrical metal film while holding or rotating the cylindrical metal film kept in a vertical position or in an oblique position (i.e., curtain or flow coating).

In a specific example, the above-mentioned dipping method was adopted for applying a polyamic acid solution selectively onto an inner surface of a cylindrical metal film.

As a second method of applying a polyamic acid solution onto an inner surface of a cylindrical metal film, the outer surface of the cylindrical metal film may be first coated with an elastic layer 2 and a release layer, and then dipped in a bath of polyamic acid solution. Similarly as the first method, before the dipping, the inner surface of the film is washed and dried, and a layer of the polyamic acid solution applied by dipping is dried and baked to form a polyimide resin layer. As the outermost surface of the cylindrical film is coated with the release layer, the resinous residue of polyimide resin, etc., remaining after the drying and baking can be easily peeled off, e.g., by air-knife or rubbing with cloth.

In a specific example, the above-mentioned second method was adopted by using a cylindrical metal film 1 of nickel coated with an elastic layer 2 and a release layer 3.

In the second method, the polyamic acid layer applied on the inner surface of the cylindrical metal film is baked in the presence of the elastic layer comprising silicone rubber, fluorinated rubber, etc., The baking temperature should preferably be suppressed to at most 280° C., more preferably at most 250° C. Further, in the case of using silicone rubber for the elastic layer, the baking temperature should preferably be at most 220° C. in view of the durable heat temperature of ca. 230° C. of silicone rubber.

In addition to the dipping methods as mentioned above, it is also possible to use another coating method, such as spray coating, for application of a polyamic acid solution onto an inner surface of a cylindrical metal film.

The rubbing layer 4 may preferably have a thickness of 5–100 μm. Below 5 μm, the rubbing layer 4 is liable to have an insufficient durability. Above 100 μm, the fixing film 10 is caused to have a large heat capacity, and requires a substantial heat-up time. It is further preferred that the thickness is 10–60 μm. As a result, it becomes possible to realize a thermal insulation so as not to direct the heat generated in the heat-generating layer 1 toward the inside without excessively increasing the heat capacity of the fixing film, whereby the efficiency of heat supply to the recording material P side can be increased to suppress the power consumption than in the absence of the rubbing layer 4. It is also possible to shorten the heat-up time (wait time).

Hereinbelow, the present invention will be described more specifically based on Examples.

EXAMPLE 1

A laminate cylindrical film comprising a 50 μm-thick nickel film of 34 min. inner diameter (as heat-generating layer 1), a 300 μm-thick silicone rubber layer (as elastic layer 2) and a 30 μm-thick PFA tube (as a release layer 3) respectively laminated via primer layers was subjected to application of a polyimide precursor varnish ("U-Varnish S", made by Ube Kosan K.K.) according to the above-mentioned second method, followed by heating for drying from 120° C. to 200° C. within 1 hour in a warm air-circulating oven and baking at 220° C. by 1 hour of standing within a warm air-circulating oven. As a result, a 15 μm-thick rubbing layer 4 comprising polyimide resin showing an imidation percentage of ca. 85% was formed, thus completing a fixing film.

EXAMPLE 2

A fixing film was prepared in the same manner as in Example 1 except that the baking of the dried polyimide precursor varnish layer was effected at 250° C. by standing for 30 min. in a warm air-circulating oven to form a 15 μm-thick rubbing layer 4 of polyimide resin showing an imidation percentage of ca. 93%.

EXAMPLE 3

A fixing film was prepared in the same manner as in Example 1 except that the baking of the dried polyimide precursor varnish layer was effected at 200° C. by standing for 30 min. in a warm air-circulating oven to form a 15 μm-thick rubbing layer 4 of polyimide resin showing an imidation percentage of ca. 70%.

EXAMPLE 4

A fixing film was prepared in the same manner as in Example 1 except that the baking of the dried polyimide precursor varnish layer was effected at 220° C. by standing for 1.5 hours in a warm air-circulating oven to form a 15 μm-thick rubbing layer 4 of polyimide resin showing an imidation percentage of ca. 90%.

EXAMPLE 5

A fixing film was prepared in the same manner as in Example 1 except that the baking of the dried polyimide precursor varnish layer was effected at 200° C. by standing for 1 hour in a warm air-circulating oven to form a 15 μm-thick rubbing layer 4 of polyimide resin showing an imidation percentage of ca. 75%.

Comparative Example 1

A fixing film was prepared in the same manner as in Example 1 except that the baking of the dried polyimide precursor varnish layer was effected at 350° C. by standing for 30 min. in a warm air-circulating oven to form a 13 μm-thick rubbing layer 4 of polyimide resin showing an imidation percentage of ca. 98%.

Comparative Example 2

A fixing film was prepared in the same manner as in Example 1 except that the baking of the dried polyimide precursor varnish layer was effected at 400° C. by standing for 30 min. in a warm air-circulating oven to form a 13 μm-thick rubbing layer 4 of polyimide resin showing an imidation percentage of substantially 100%.

[Durability Test]

Each of the fixing films prepared in Examples 1–5 and Comparative Examples 1–2 was installed as a fixing film 10 in a fixing apparatus 100 of the electromagnetic induction heating type having an arrangement as shown in FIG. 3 and subjected to a blank rotation durability test. More specifically, the fixing film 10 thus installed was pressed against a rubber pressure roller 30 comprising a 3 mm-thick silicone rubber roller coated with a 30 μm-thick PFA tube and having an outer diameter of 30 mm, at a pressure of 200N so as to form a fixing nip of 8 mm×230 mm. The fixing film was moved at a surface speed of 100 mm/sec and continuously for 500 hours;

As a result, the fixing film of Example 1 caused an abrasion of about 5 μm as an average value in the longitudinal direction, and no breakage of the nickel-heat generating layer 1 was observed.

As a result of measurement of a rotation torque, the increase of which is liable to result in failure of rotation of the film following the rotation of the pressure roller or abnormal temperature elevation, the fixing film of Example 1 exhibited rotation torques of 0.20 N.m at the initial stage and ca. 0.39 N.m after the 500 hours of rotation, thus showing only a slight increase. As a control, a fixing film having no polyimide resin rubbing layer exhibited a rotation torque which was initially 0.20 N.m, but increased to 0.39 N.m in about 100 hours and 0.98 N.m in 200 hours.

The fixing film of Example 2 caused an average abrasion in the longitudinal direction of ca. 4 μm but caused a crack at an edge of the nickel-heat generating layer 1 after about 400 hours, which crack was substantially grown in the longitudinal direction after 500 hours.

The fixing film of Example 3 caused a rather large average abrasion in the longitudinal direction of ca. 10 μm but caused no breakage of the nickel layer after the 500 hours of the rotation test.

The fixing film of Example 4 caused an average abrasion in the longitudinal direction of ca. 4 μm but caused a crack at an edge of the nickel-heat generating layer 1 after about 450 hours, which crack was grown up to ca. 1 μm in the longitudinal direction after 500 hours.

The fixing film of Example 5 caused an average abrasion in the longitudinal direction of ca. 8 μm but caused no breakage of the nickel layer after the 500 hours of the rotation test.

The fixing film of Comparative Example 1 caused a crack at an edge of the nickel-heat generating layer 1 after about 100 hours, and the crack was thereafter grown until the continuation of the test became impossible after 120 hours.

The fixing film of Comparative Example 2 caused a crack at an edge of the nickel-heat generating layer 1 after about 30 hours, and the crack was thereafter grown until the continuation of the test became impossible after 40 hours.

From the above results, a polyimide resin layer having an imidation percentage of at least 70%, preferably 80% or higher, functioned well as a rubbing layer. Incidentally, as the fixing film operation temperature in operation was around 200° C., it was confirmed that a polyimide resin layer showing a lower imidation percentage at the initial stage was caused to have a higher imidation percentage as the film was continuously used.

[Image Forming Durability Test]

Fixing apparatus as used in the above blank rotation durability test but equipped with fresh fixing films of respective Examples were each installed in a full-color laser beam printer ("LBP-2040", made by Canon K.K.) and subjected to an image forming durability test under the conditions of a pressure of 200 N, a fixing nip of 8 mm×230 mm, a fixing temperature of 180° C. and a process speed of 180° C.

As a result, the fixing films of Examples 1, 2 and 4 completed continuous image formation on $10^5$ sheets without trouble. The fixing films of Examples 3 and 5 caused paper transfer failure due to increased rotation torque after $5×10^4$ sheets and $8×10^4$ sheets, respectively.

On the other hand, the fixing films of Comparative Examples 1 and 2 caused paper transfer failure due to the breakage thereof after $2×10^4$ sheets and $1×10^4$ sheets, respectively.

The results of the above Examples and Comparative Examples are summarized in the following Table 1.

TABLE 1

| Example | Imidation percentage | Baking condition | Durability test Blank rotation | | |
|---|---|---|---|---|---|
| | | | Durability time | Abrasion after 500 hrs. | Image formation |
| 1 | 85 (%) | 220° C. × 1 hr. | ≧500 (hrs) | 5 (μm) | ≧$10^5$ (sheets) |
| 2 | 93 | 250° C. × 0.5 hr. | 400 | 4 | ≧$10^5$ |
| 3 | 70 | 200° C. × 0.5 hr. | ≧500 | 10 | $5 × 10^4$ |
| 4 | 90 | 220° C. × 1.5 hr. | 450 | 4 | ≧$10^5$ |
| 5 | 70 | 200° C. × 1 hr. | ≧500 | 8 | $8 × 10^4$ |
| Comp. 1 | 98 | 350° C. × 0.5 hr. | 100 | — | $2 × 10^4$ |
| Comp. 2 | 100 | 400° C. × 0.5 hr. | 40 | — | $1 × 10^4$ |

The laminate film of the present invention has been described principally with reference to a particularly preferred example thereof of a fixing film for use in a fixing apparatus of the electromagnetic induction heating-type wherein the metal layer is used as a heat-generating layer. However, the laminate film of the present invention can also be effectively used as a fixing film of the film-heating type fixing apparatus wherein fixation heat is generated by a heat-generating member in contact with the fixing film and transferred via the fixing film to heat a yet-unfixed image. Moreover, the laminate film of the present invention is generally preferably used as a resin/metal laminate film expected to show a good combination of heat-resistance flexibility and mechanical toughness, especially under application of heat and pressure.

What is claimed is:

1. A laminate film, comprising a metal layer and a polyimide resin layer, wherein the polyimide resin layer has an imidation percentage of 70–93%.

2. A laminate film according to claim 1, wherein the polyimide resin layer has an imidation percentage of 75–90%.

3. A laminate film according to claim 1, wherein the polyimide resin layer comprises a polyimide represented by a recurring unit as shown below:

4. A laminate film according to claim 1, wherein the metal layer comprises nickel.

5. A laminate film according to claim 1, wherein the metal layer has a thickness of 1 to 100 μm, and the polyimide resin layer has a thickness of 5–100 μm.

6. A laminate film comprising a metal layer and a polyimide resin layer, wherein the polyimide resin layer has an imidation percentage of 70–93%, and an elastic layer on the metal layer.

7. A laminate film according to claim 6, further including a release layer on the elastic layer.

8. A laminate film according to claim 7, wherein the release layer comprises a material selected from the group consisting of fluorine-containing resin, silicone resin, fluorosilicone rubber, fluorine containing rubber and silicone rubber.

9. A laminate film according to claim 1, having an endless film form.

10. A fixing film, comprising a metal layer and a polyimide resin layer, wherein the polyimide resin layer has an imidation percentage of 70–93%.

11. A fixing film according to claim 10, wherein the metal layer comprises nickel, and the polyimide resin layer comprises a polyimide represented by a recurring unit as shown below:

12. An image heating apparatus, comprising: a fixing film comprising a metal layer and a polyimide resin layer, and a pair of pressing members pressed against each other via the fixing film, so that the polyimide resin layer of the fixing film is moved in contact with and relative to one of the pressing members and the fixing film supplies heat to an image on a recording material, wherein the fixing film comprises a laminate film according to any one of claims 1 to 9.

13. An image heating apparatus according to claim 12, including a magnetic flux-generating means on a side of said one pressing member contacting the polyimide resin layer, so that the metal layer of the fixing film is caused to generate heat for heating the image on the recording material by receiving a magnetic flux generated by the magnetic flux-generating means.

14. An image heating apparatus according to claim 12, wherein said one pressing member contacting the polyimide resin layer is a heat-generating member which generates heat that is transferred via the fixing film to heat the image on the recording material.

* * * * *

UNITED STATES PATENT AND TRADEMARK OFFICE
CERTIFICATE OF CORRECTION

PATENT NO. : 6,670,044 B2
DATED : December 30, 2003
INVENTOR(S) : Tomonori Shida et al.

It is certified that error appears in the above-identified patent and that said Letters Patent is hereby corrected as shown below:

<u>Column 4,</u>
Lines 12 and 13, "amount" should read -- number --.
Line 31, "a:" should read -- B: -- .

<u>Column 5,</u>
Line 59, "matters" should read -- matter --.
Line 60,. "are" should read -- is --.

<u>Column 7,</u>
Line 15, "made," should read -- mode, --.

Signed and Sealed this

Twenty-ninth Day of June, 2004

JON W. DUDAS
*Acting Director of the United States Patent and Trademark Office*